United States Patent [19]

Sakurai

[11] Patent Number: 4,832,655
[45] Date of Patent: May 23, 1989

[54] COIN STACKING APPARATUS

[75] Inventor: Tomonari Sakurai, Saitama, Japan

[73] Assignee: Laurel Bank Machines Co., Ltd., Tokyo, Japan

[21] Appl. No.: 15,987

[22] Filed: Feb. 18, 1987

[30] Foreign Application Priority Data

Feb. 28, 1986 [JP] Japan .................. 61-43457

[51] Int. Cl.$^4$ ............................................. G07D 9/00
[52] U.S. Cl. ........................................ 453/61; 453/31;
53/212; 53/532; 53/254; 414/788.9; 414/794.8
[58] Field of Search ............... 453/31, 61, 56; 53/212,
53/254, 532; 414/98, 48, 81; 198/625

[56] References Cited

U.S. PATENT DOCUMENTS

| 4,257,208 | 3/1981 | Uchida ............................ 53/212 |
| 4,547,114 | 10/1985 | Watrous et al. ................. 414/81 |

FOREIGN PATENT DOCUMENTS

| 0104923 | 4/1984 | European Pat. Off. . |
| 1574176 | 4/1967 | Fed. Rep. of Germany . |
| 2646889 | 10/1976 | Fed. Rep. of Germany . |
| 3043349 | 11/1980 | Fed. Rep. of Germany . |
| 52-26295 | 2/1977 | Japan . |
| 53-11293 | 1/1978 | Japan . |
| 53-56094 | 5/1978 | Japan . |
| 56-95774 | 7/1981 | Japan . |
| 58-171318 | 10/1983 | Japan . |
| 59-12688 | 4/1984 | Japan . |
| 59-121491 | 7/1984 | Japan . |

Primary Examiner—Joseph J. Rolla
Attorney, Agent, or Firm—Fleit, Jacobson, Cohn & Price

[57] ABSTRACT

A coin stacking apparatus comprises a coin passageway for conveying coins edge-wise, one at a time, and delivering them horizontally. A stacking station is provided for receiving the coins delivered from the forward end of the coin passageway to stack them therein. The stacking station comprises a pair of coin stacking drums each of which has on its outer periphery a ridge providing a support surface for supporting the bottom face of each of the coins delivered from the coin passageway. The ridges on the coin stacking drums are arranged in phase and in the opposite orientations. Each of the ridges is of a spiral configuration raised forwardly in the direction of coin conveyance. A drive mechanism is provided to rotate each of the coin stacking drums in such a direction that the coin support surface of the ridges is inclined downwardly.

3 Claims, 7 Drawing Sheets

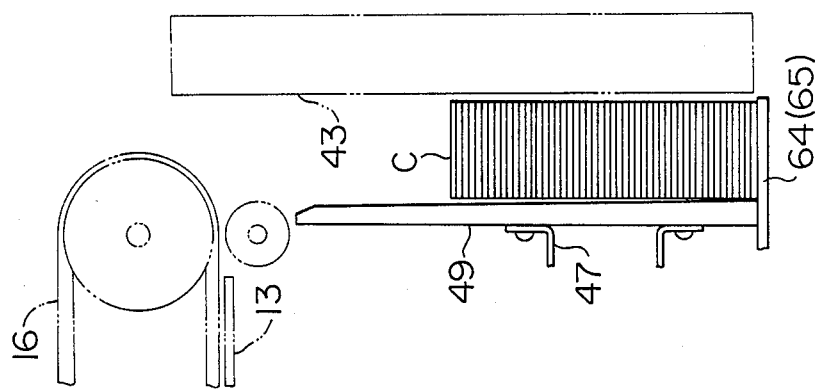
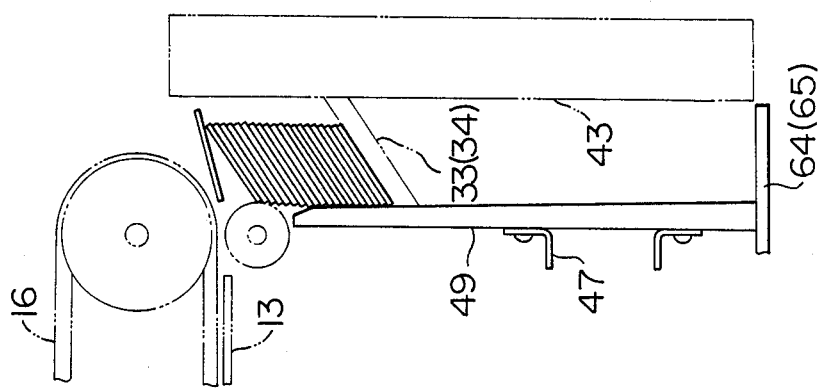
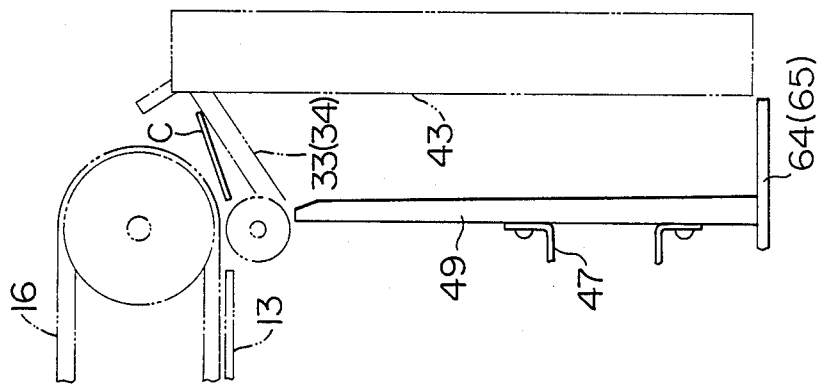

COIN STACKING APPARATUS

BACKGROUND OF THE INVENTION

The present invention relates to a coin stacking apparatus for conveying coins edge-wise one by one and then forming a stack of the coins.

When a plurality of coins is to be packed or wrapped, the coins must be properly stacked prior to the packing process and other processes.

One prior art coin stacking systems is disclosed in Japanese Laid-Open Patent Application 58-17318. As shown in FIGS. 9 and 10, such a coin stacking system comprises a coin passageway 1, a receiver section 2 for receiving coins delivered horizontally from the coin passageway 1 in a stacked condition, and a pair of endless belts 3 extending along the length of the receiver section 2 and having receiving members 4 on which the delivered coins C are placed and stacked. The receiving members 4 are first positioned at the uppermost part of the receiver section 2. The endless belts 3 are then moved in the direction shown by arrow (a) in FIG. 9 by a distance corresponding to the thickness of one coin while the coins are stacked on the receiving members 4 one by one. After the stacking operation is terminated, the receiving members 4 are retracted laterally and outwardly from the bottom of the receiving section 2 as shown by arrow (b) in FIG. 10. As a result, the stacked coins C will be discharged downwardly. Above the receiver section 2, there are arranged a free roller 5 for forcing each of the coins C delivered horizontally from the coin passageway 1 into a forwardly and downwardly inclined position, a guide member (roller) for picking up the leading edge of the forwardly and downwardly inclined coin C, and a stop member 7 adapted to be impacted by the leading edge of the picked-up coin C for causing that coin to fall into the receiver section 2. As shown by the chain line in FIG. 9, the coin C can fall into the receiver section 2 with its leading edge directed upwardly. Therefore, such an arrangement may prevent jamming due to the impact of the trailing edge of a coin C on the leading edge of another subsequently delivered coin C.

However, the prevention of the impact between coins subsequently delivered from the coin passageway 1 to the receiver section 2 must be attained by such a complicated process that a coin C is first inclined forwardly and downwardly by the free roller 5, secondly picked up at its leading edge and finally impacted by the stop member 7. This tends to reduce the speed of the coin handling process. Simultaneously, the whole system becomes complicated and increased in size.

Since the receiving members 4 are supported on the endless belts 3 of rubber or the like, vibration of receiving members 4 cannot be avoided. Thus, the coins cannot be stacked properly, requiring that the irregularly stacked coins be properly re-positioned.

SUMMARY OF THE INVENTION

It is, therefore, an object of the present invention to provide a coin stacking apparatus which can prevent the impact between coins delivered from the coin passageway to the receiver section to prevent the jamming of the coins, which can prevent the coins from being irregularly stacked and which can re-arrange the stacked coins properly.

To accomplish the above object, the present invention provided a pair of coin stacking drums arranged at the outlet of a coin passageway for guiding and conveying coins in line, each of the coin stacking drums having at its outer periphery a spiral ridge oriented in the direction opposite to that of a similar spiral ridge on the other coin stacking drum, the coin stacking drums being rotated in phase and intermittently in the opposite directions such that each of the coins will be spanned and supported between the spiral ridges on the coin stacking drums and downwardly moved into a stacked condition.

Said spiral ridges provide coin support surfaces for supporting the opposite side edges of a coin to be stacked. As the coin stacking drums are being rotated, these coin support surfaces are moved by a distance corresponding to the thickness of a coin when each of the coins is delivered from the coin passageway and shifted downwardly while maintaining the top of the stacked coins constant. Thus, the coins will be stacked in a skewed position along the spiral ridges with the forward edge of each of the coins being positioned upwardly relative to the rearward edge of the same.

BRIEF DESCRIPTION OF THE DRAWINGS

The above and other objects of this invention will be seen by reference to the following description taken in connection with the accompanying drawings, in which:

FIGS. 1 through 8 show one embodiment of the present invention; FIG. 1 being a plan view of the coin delivering section; FIG. 2 being a plan view of the stacking area; FIG. 3 being a plan view of the shutter mechanism located below the stacking area; FIG. 4 being a view taken along a line IV—IV of FIG. 2 in the direction of arrow; FIG. 5 being a side view of the coin stacking drums; FIG. 6 being a side view of the coin type setting section; FIG. 7 being a side view of the drive mechanism and FIGS. 8 (a), (b) and (c) being side views illustrating different operational positions of the coin stacking apparatus.

FIG. 9 being a front and sectional view and FIG. 10 being a view taken along a line X—X of FIG. 9 in the direction of the arrow.

DESCRIPTION OF THE PREFERRED EMBODIMENTS

Figure 1:
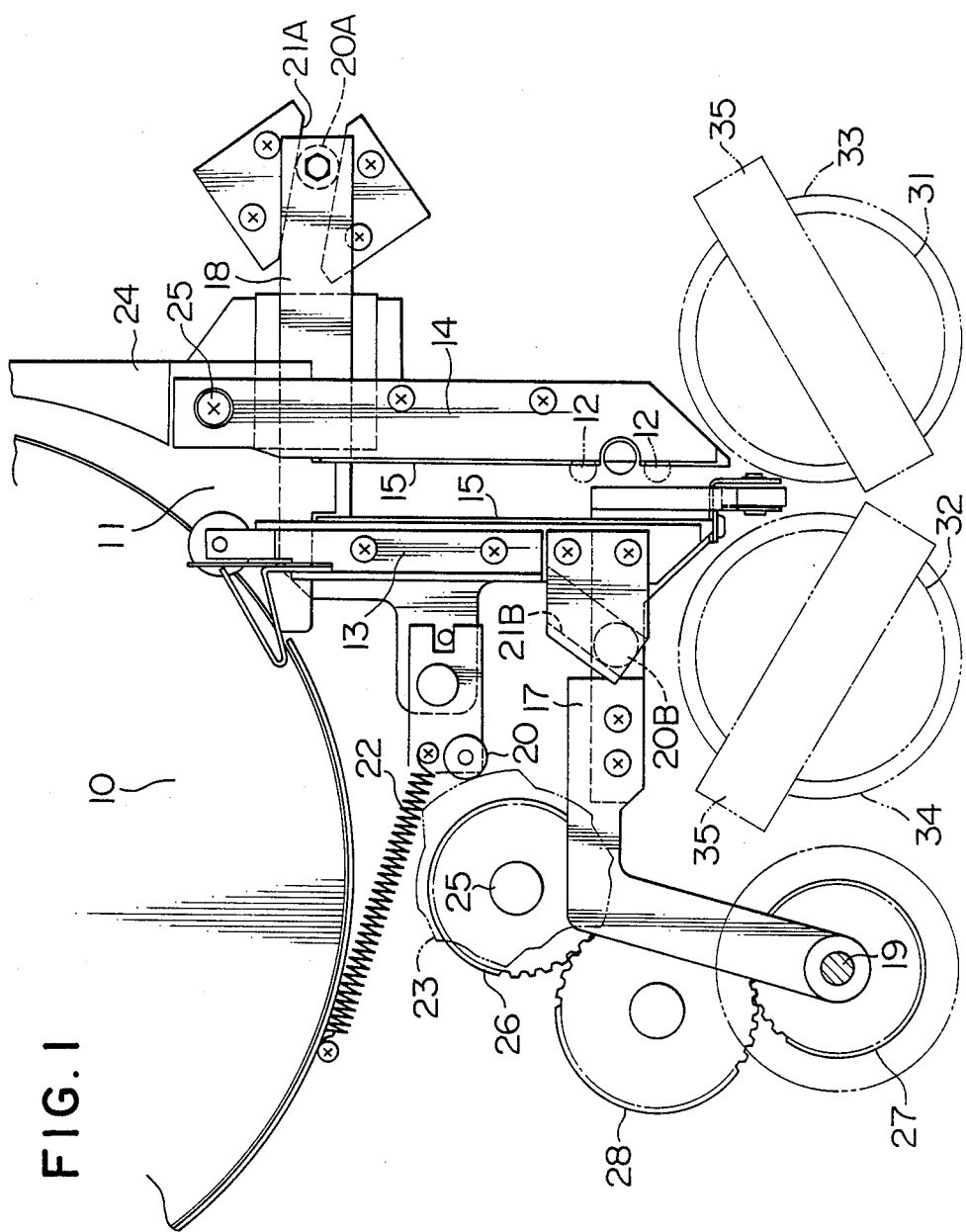

An embodiment of a coin stacking apparatus according to the present invention will now be described with reference to FIGS. 1 through 8.

In the drawings, reference numeral 10 denotes a rotary disc on which coins C are placed. This rotary disc 10 is connected with a coin passageway 11 which is adapted to guide and convey the coins C delivered from the rotary disc 10 in line horizontally, that is, downwardly as viewed in FIG. 1. The coin passageway 11 includes sensors 12, for example, magnetic sensors for sensing each of the coins passing through the passageway 11 and generating an output detection signal.

The coin passageway also includes a pair of rails 13 and 14 extending parallel to each other and having steps 15 for supporting the opposite side edges of each of the coins C, and a conveyor belt 16 (see FIG. 8) located above the coin passageway 11 and adapted to frictionally engage the top face of each of the coins C to convey them under a frictional force.

The rails 13 and 14 can be moved toward or away from each other such that the spacing therebetween will be adjusted to match the type of any coins to be packed.

More particularly, one of the rails 13 includes a ca follower 20 engaging a passageway width adjusting cam 23 and another cam follower 20A adapted to move in a guide groove 21A. By the use of these cam followers 20 and 21A, the rail 13 can be set at a desired position and angle. The rail 13 also includes a plate-like member 18 formed integrally thereon and which also is slidably supported by the other rail 14. Thus, the rail 13 can be moved parallel to the rail 14. The rail 14 can be rotated about a pin 24a located adjacent to a guide member 24 with the rotation thereof being determined by the angle of the inclined rail 13.

An L-shaped arm 17 is pivotally supported at one end by a shaft 19 with the other end thereof supporting a guide roller 30 which is located relative to the bottom face of the coin passageway 11 and adapted t guide the coins. The L-shaped arm. 17 supports a cam follower 20B engaging a guide groove 21B which is formed on the rail 13. When the rail 13 is moved, the guide roller 30 also is moved together.

The passageway width adjusting cam 23 has on its outer periphery a plurality of ridges having different heights. Depending on the heights of these ridges, the rails 13 and 14 are moved to adjust the width of the coin passageway 11 for the type of the coins to be packed.

A stop 29 is provided which can be moved to its , retracted position shown in FIG. 1 or to its extended position horizontally rotated from this retracted position through an angle of 90 degrees. At the extended position, the stop 29 blocks the flow of the coins C in the coin passageway 11.

Figure 5:
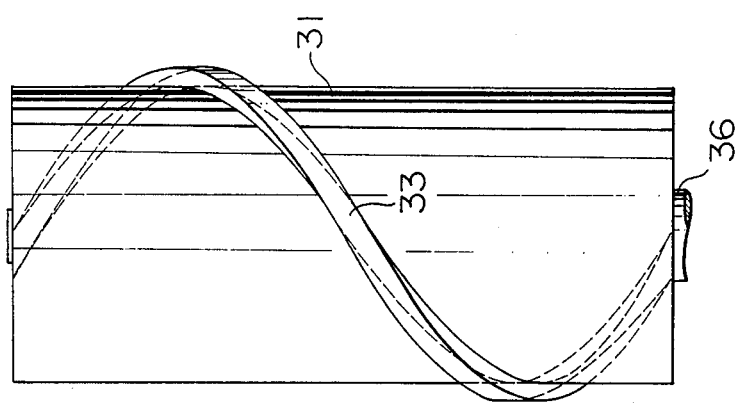

Forwardly of the coin passageway 11, there is provided a pair of coin stacking drums 31 and 32 rotated while supporting the coins C delivered from the coin passageway 11. One of the coin stacking drums 31 has an outline as shown in FIG. 5 with its outer periphery formed in a spiral ridge 33 which is in the form of a right-hand thread starting from the top of the drum 31 and spirally extending toward the bottom of the same in the counter-clockwise direction shown by the arrow in FIG. 1. On the other hand, the coin stacking drum 32 is formed with a spiral ridge 34 which is a left-hand thread spirally extending from the top to the bottom of the drum 32 in the direction opposite to that of the spiral ridge 33 on the coin stacking drum 31. The start and end of each of the spiral ridges 33 and 34 are positioned out of phase in the circumferential direction of the corresponding drum 31 or 32.

Figure 4:
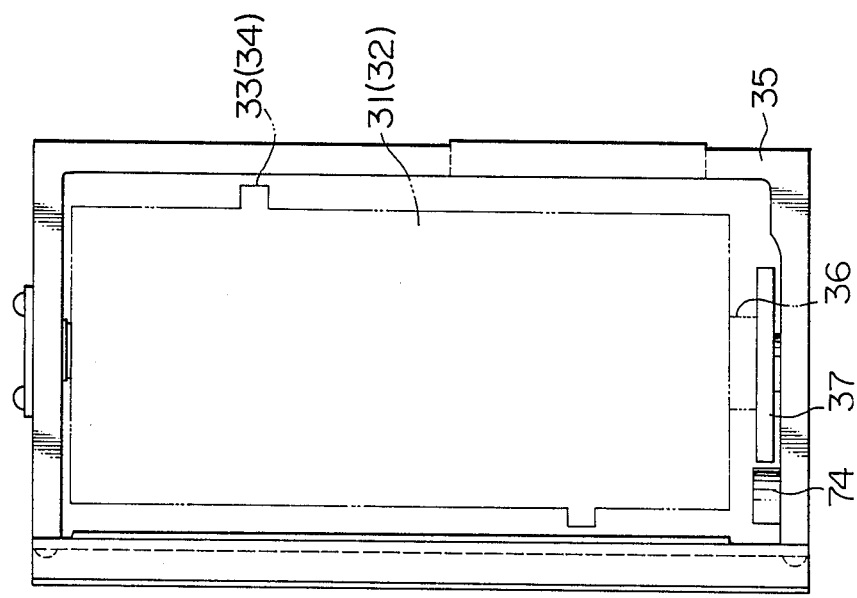

As seen from FIG. 4, each of the coin stacking drums 31 and 32 is supported by a frame-like support arm 35 to be rotatable about a shaft 36. The spacing between the stacking drums 31 and 32 can be adjusted in connection with the type of coins to be stacked. A mechanism for moving the stacking drums 31 and 32 (that is, support arms 35 supporting these drums) will be described below.

Figure 2:
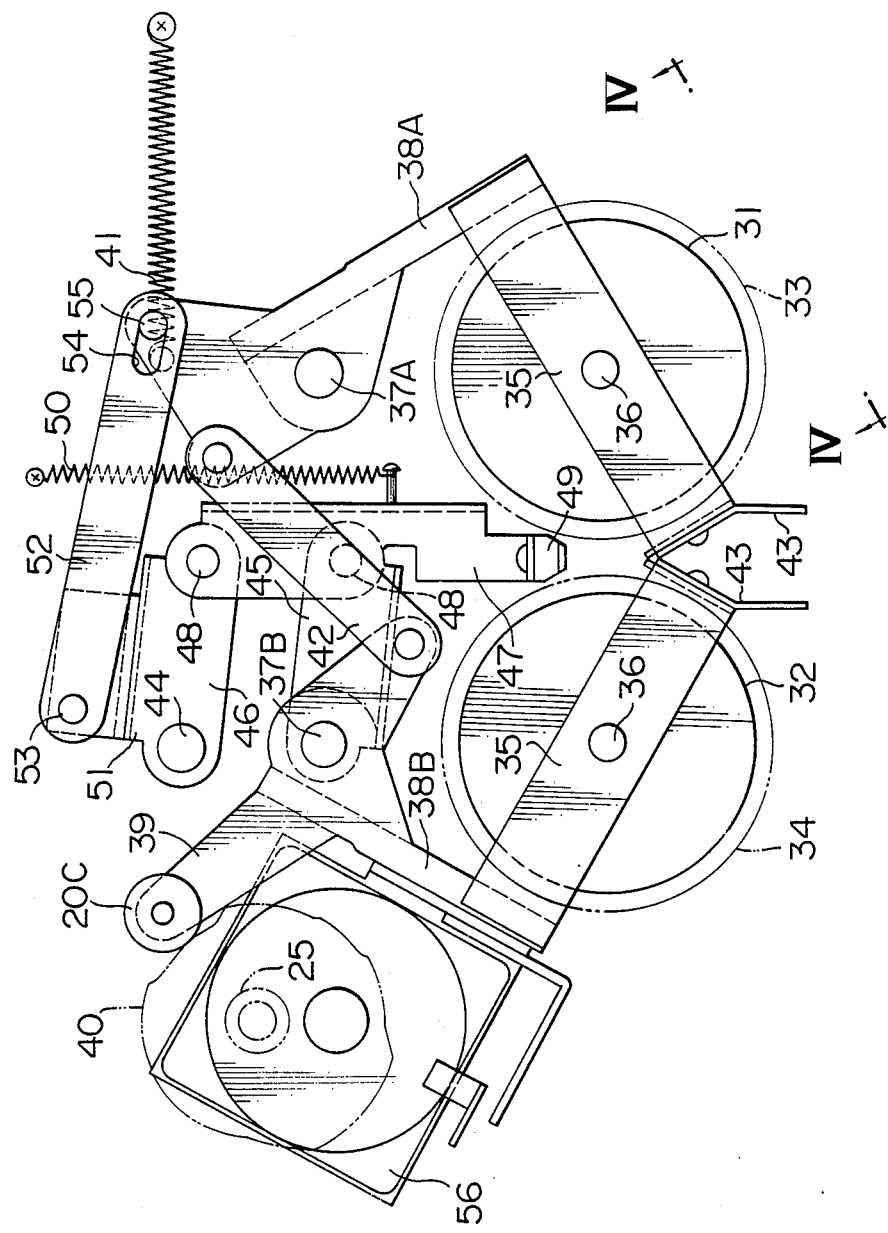
Figure 3:
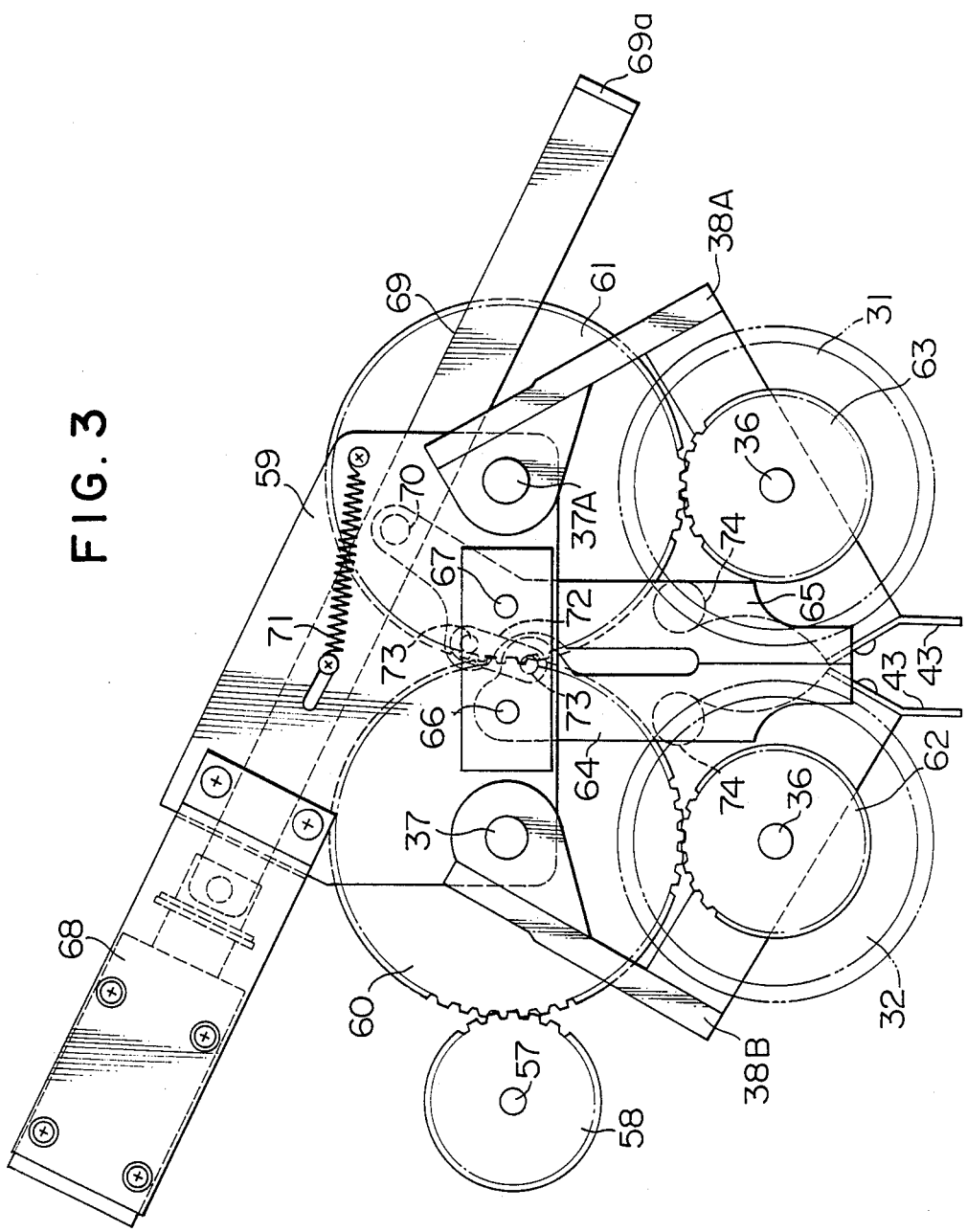

As seen from FIG. 2, each of the support arms 35 is rigidly mounted on a swingable frame 38A or 38B which in turn is pivotally supported by a shaft 37A or 37B. The swingable frame 38B is formed integrally with an arm 39 which has at its one end a cam follower 20C co-operating with a drum setting cam 40. On the other hand, the swingable frame 38A is resiliently biased about the shaft 37A clockwise as viewed in FIG. 2 under the action of a tension spring 41 and also connected with the swingable frame 38B through a link arm 42. The resilient force of the tension spring 41 acts on the swingable frame 38B through the link arm 42 so that the swingable frame 38B will be biased about the shaft 37B counter-clockwise as viewed in FIG. 2. Thus, the coin stacking drums 31 and 32 will be biased toward each other with the cam follower 20C engaging with the drum setting cam 40.

As seen from FIG. 2, further, each of the support arms 35 has at its free end a forward stop plate 43. The forward stop plates 43 are of substantially the same length as that of the coin stacking drums 31 and 32 so that the stacked coins C supported between the stacking drums 31 and 32 can be prevented from collapsing.

A shaft 44 is located adjacent to the shaft 37B parallel thereto. These shafts 37B and 44 support pivotable guide plate supporting members 45 and 46, respectively. A link arm 47 is pivotally connected with the guide plate supporting members 45 and 46 through pins 48. The free end of the link arm 47 is provided with a stack guide plate 49 extending vertically and parallel to the stacking drums 31 and 32 and adapted to support the stacked coins C between the stacking drums 31 and 32 at a position opposite to said forward stop plate 43. The link arm 47 is biased upwardly as viewed in FIG. 1, that is, in the direction away from the stacking drums 31 and 32 under the action of a tension spring 50. The stack guide plate supporting member 46 is formed with a connection 51 which is pivotally connected with a restricting arm 52 at one end through a pin 53. The other end of the restricting arm 52 is formed with a slot 54 which movably receives an engagement pin 55 on the swingable frame 38A. In such a manner, the force of the tension spring 41 acts on the restricting arm 52 through the engagement pin 55 and also provides a moment to the guide plate supporting member 46 clockwise about the shaft 44 through the restricting arm 52. As a result, the stack guide plate 49 can be biased toward the coin stacking drums 31 and 32 against the action of the tension spring 50 and under a force smaller than that of the tension spring 50.

A drive 56 is provided which includes a stepping motor for rotating the coin stacking drums 31 and 32. A mechanism for transmitting the rotation of the drive motor 56 to the stacking drums 31 and 32 will now be described with reference to FIG. 3.

The drive motor 56 has an output shaft 57 on which a drive gear 58 is rigidly mounted. The drive gear 58 meshes with a spur gear 60 rotatable about the shaft 37B supported on a frame 59 and supporting the swingable frame 38B. The spur gear 60 also meshes with a spur gear 61 rotatable about the shaft 37A supported on the frame 59 and supporting the swingable frame 38A. The spur gears 60 and 61 mesh with spur gears 62 and 63 integral with the shafts 36 of the stacking drums 31 and 32, respectively. Thus, the coin stacking drums 31 and 32 can rotate in opposite directions.

A shutter mechanism for supporting the bottom of the coin stack between the coin stacking drums 31 and 32 will now be described.

The shutter mechanism comprises shutters 64 and 65 located below the bottoms of the coin stacking drums 31 and 32. The shutters 64 and 65 are horizontally pivotable about shafts 66 and 67 on the frame 59 between their closed or coin stacking position below the stacking drums 31 and 32 and their opened or retracted position out of the path of coin stack.

The end of the shutter 65 is pivotally connected with a shutter actuating member 69 through a pin 70, the shutter actuating member 69 being capable of being reciprocated by a solenoid 68. The shutter actuating member 69 is biased under the action of a tension spring 71 such that a moment will be exerted on the shutter 65 about a shaft 67 clockwise as viewed in FIG. 3. The shutters 64 and 65 are pivotally connected with a link arm 72 through the respective pins 73. Therefore, the rotational moment on the shutter 65 is transmitted to the shutter 64 so that the latter will receive a rotational moment in the opposite direction.

In such a manner, the shutters 64 and 65 are biased toward each other (that is, to their closed positions) under the action of the tension spring 71. When the solenoid 68 is energized, the shutters 64 and 65 can be moved away from each other (that is, their opened positions).

Projections 74 are provided which support the bottom faces of the shutters 64 and 65 to prevent them from bending. The projections 74 are rigidly mounted on the respective support arms 35, as shown in FIG. 4. The shutter actuating member 69 has an extension extending outwardly beyond the area wherein the mechanism for actuating the stacking drums, coin passageway and other elements are located. The extension of the shutter actuating member 69 is formed at its outer end with an operating knob 69a. By manually operating the knob 69a, the shutters 64 and 65 can forcedly be opened or closed to remove a coin jammed therebetween or to remove the solenoid when it is in fault.

Figure 6:
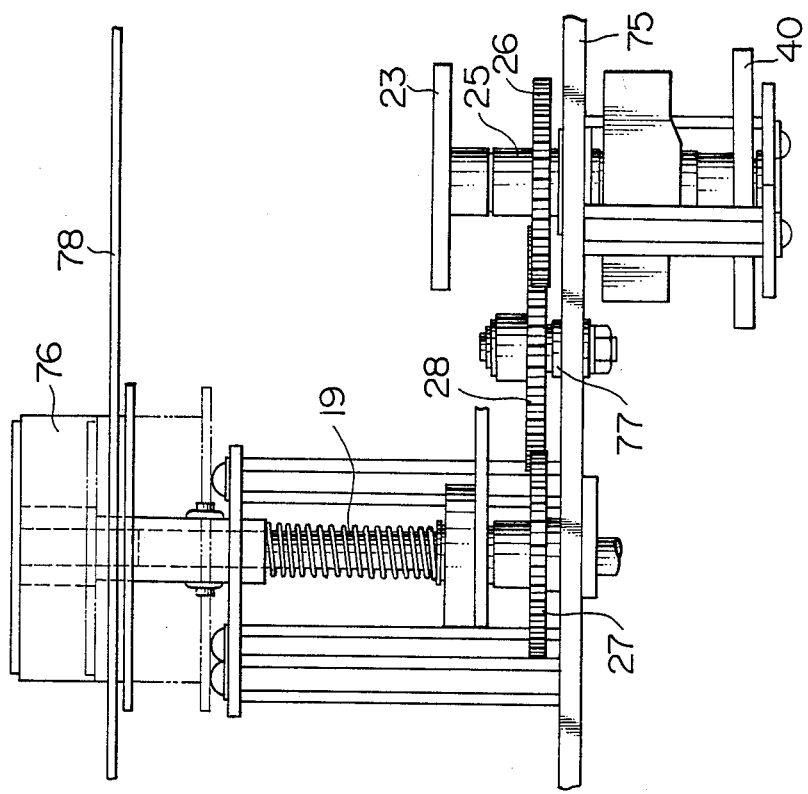
Figure 9:
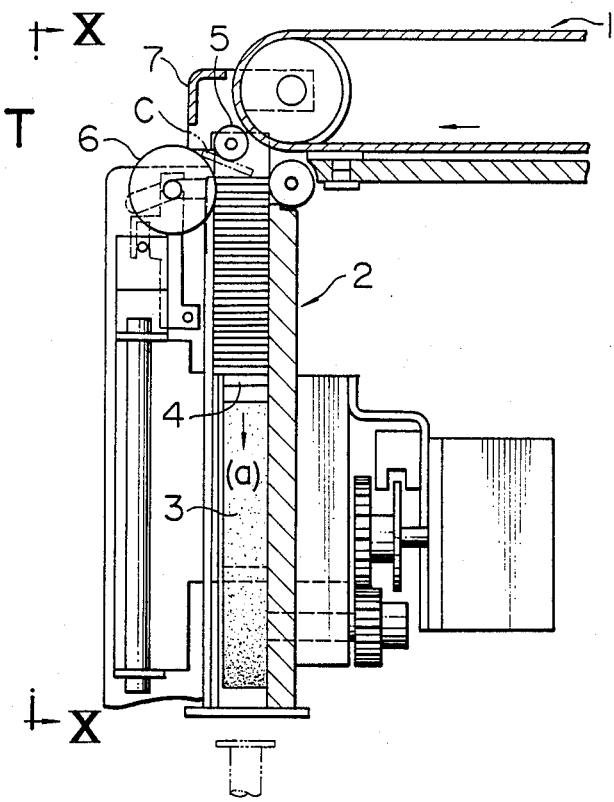
FIGS. 9 and 10 show one example of the prior art coin stacking systems.
Figure 10:
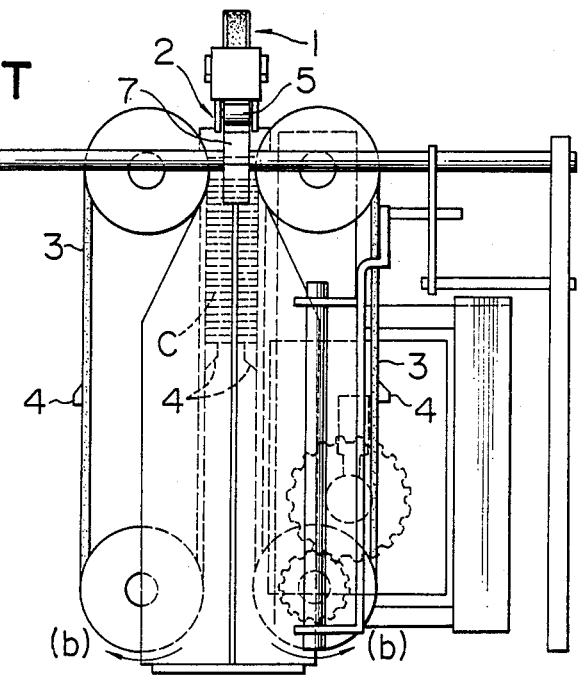

A mechanism for actuating the passageway width setting cam 23 and the stacking drum setting cam 40 will next be described with reference to FIG. 6.

The cams 23 and 40 are mounted on the cam shaft 25 to rotate together, the shaft 25 being rotatably supported on a frame 75. The cam shaft 25 rigidly supports a spur gear 26 which is operatively connected with a shaft 19 operated by a coin type setting dial 76 through a spur gear 27 and an intermediate gear 28 supported by a shaft 77. The coin type setting dial 76 is located outside a machine frame 78 and can manually be actuated to operate both the setting cams 23 and 40 externally of the machine.

Figure 7:
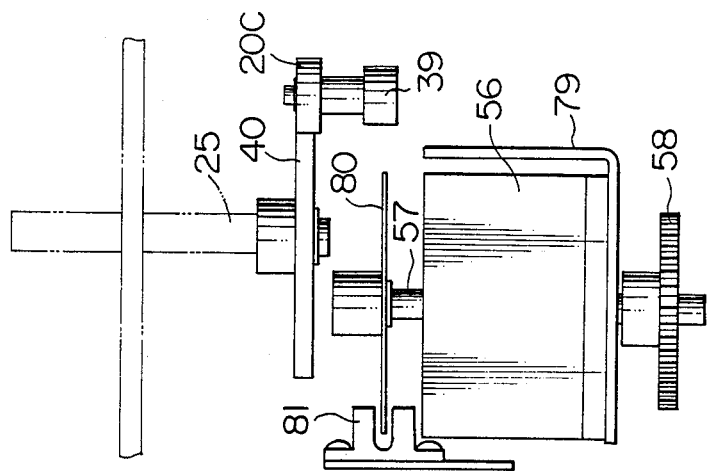

The drive motor 56 for the stacking drums is located relative to the mechanism actuating the setting cams 23 and 40 in such a positional relationship as shown in FIG. 7.

The drive motor 56 is supported on a frame 79 with its output shaft 57 having a downward extension on which a gear 58 is rigidly mounted. The output shaft 57 of the drive motor 56 also has an upward extension on which a rotary disc 80 having a number of slits formed thereon is rigidly mounted. The slits on the rotary disc 80 are optically read by a sensor 81 to sense the amount of rotation in the drive motor 56.

The coin stacking apparatus constructed as described is actuated to stack coins in the following manner:

(i) Preparatory operation

When the coin type setting dial 76 is rotated for the type of coins to be stacked, the cam shaft 25 is rotated to cause the passageway width adjusting cam 23 to urge the cam follower 20. As a result, the rail 13 is moved and inclined rightwardly or leftwardly as viewed in FIG. 1. In association with the motion of the rail 13, the rail 14 is pivoted about the pin 24a so as to adjust the width of the coin passageway 11 for the type or external diameter of coins to be stacked C.

The rotation of the cam shaft 25 causes rotation of the stacking drum setting cam 40. One of the outer peripheral ridges of the stacking drum setting cam 40 urges the cam follower 20C to pivot the swingable frame 38B about the shaft 37B. On the other hand, the swingable frame 38A connected with the swingable frame 38B through the link arm 42 is pivoted about the shaft 37A in the direction opposite to that of the swingable frame 38B. The pivotal movement of the swingable frame 38A is transmitted to the guide plate supporting member 46 through the restricting arm 52 so that the link arm 47 will be moved to shift the stack guide plate 49 linearly.

In such a manner, the support arms 35 for the stacking drums 31 and 32 are pivoted in the opposite directions by operating the stacking drum setting cam 40. At the same time, the stack guide plate 49 is moved to adjust the magnitude of a space in which coins C are to be stacked, without movement of its central position.

(ii) Coin stacking operation

When the rotary disc 10 is rotated and the conveyor belt 16 is actuated, coins are moved in and along the coin passageway 11. During movement of the coins C in the passageway 11, coins having external diameters smaller than the setting can drop downwardly from between the rails 13 and 14, only coins of the desired type moving within and along the coin passageway 11 The sensors 12 generate output signals at the passage of each of the moving coins C. The output signals from the sensors 12 are counted to determine the number of the coins moving through the coin passageway 11. If there is a false coin having the same external diameter but being of a different material, the sensors 12 detects this false coin by sensing the magnetic characteristic is different from that of the proper coins. The sensors 12 then cause the machine to stop or an alarm device to actuate. Thereafter, the stop 29 disposed between the sensors 12 is moved into the coin passageway 11 to block the false coin. After the proper coins C have been delivered from the forward end of the coin passageway 11 as shown in FIG. 8 (a), they impact on the forward stopper plate 43 and then fall into the receiver section. The fallen coins are supported at their side edges on the inclined support surfaces of the projections 33 and 34 with the leading edge of each of the supported coins being inclined upwardly.

As a coin C is delivered in such a manner, the drive motor 56 is incrementally energized to drive the coin stacking drums 31 and 32 such that the support surfaces on the projections 32 and 33 are incrementally moved downwardly by a distance corresponding to the thickness of one coin C. A this time, the coin stacking drums 31 and 32 are rotated counter-clockwise and clockwise as viewed in FIG. 1, respectively. As such a process is repeated, the coins C will be stacked on the projections 33 and 34 while being held between the stacking drums 31 and 33 and the stack guide plate 49, as shown in FIG. 8 (b). Since the top face of each of the stacked coins C is downwardly inclined at its trailing edge as viewed in the direction of coin delivery, any subsequently delivered coin C will not impact the previously stacked coins at their trailing edges.

The stepped energization of the drive motor 56 is in synchronism with the delivery cycle of the cons C, for example, by repeating the energization and de-energization of the drive motor 56 in response to the coin detection signals from the sensors 12.

When the output signals from the sensors 12 have been counted up to a predetermined value indicative that the desired number of coins are in the formed stack, the rotary disc 10 and the conveyor belt 16 are stopped to terminate the delivery of the coins C. When the stacking drums 31 and 32 are further rotated, the bottom of the stacked coins C is disengaged by the top faces of the spiral ridges 33 and 34 and then placed horizontally on the shutters 64 and 65 as shown in FIG. 8 (c). Thus, the stacking process is terminated.

When the shutters 64 and 65 are moved away from each other under the actuation of the solenoid 68, the coin stack falls downwardly onto a vertically movable receiving member (not shown) located at a stand-by position below the shutters 64 and 65. The coin stack may then be moved to the subsequent process, for example, a coin packing process while being placed on such a receiving member.

Although the aforementioned embodiment has been described with the forward stop plate impacted by the delivered coins such that they will be fallen and stacked on the projections, an upper stop plate 43A may be provided in addition to the forward stop plate as shown by the chain line in FIG. 8 (a), when it is required to increase the speed of coin movement in the coin passageway for the purpose of increasing the speed of the process. Thus, coins can be impact between coins.

As will be apparent from the foregoing, the coin stacking apparatus according to the present invention has the following advantages.

(i) Since the spiral ridges formed on the outer peripheries of the coin stacking drums are utilized as coin supporting surfaces, the coins are stacked with their trailing edges inclined downwardly. The leading edge of each of the coins horizontally delivered from the coin in the stack while sliding thereon. Consequently, the impact between the subsequently delivered coins will effectively be prevented, preventing jamming.

(ii) Since the stacked coins are held skewed, their side edges can be engaged by any stop means extending along the height of the stacking drums to properly arrange the stacked coins.

(iii) Since the coins to be stacked are supported by the stacking drums and the spiral ridges thereon, there can be provided stable supporting surfaces which will not be influenced by any external disturbance such as vibration, for example, in comparison with a belt utilized to stack coins.

What we claim is:

1. A coin stacking apparatus comprising:
a coin passageway conveying coins edgewise, one at a time, and delivering the coins horizontally, and
a stacking station for receiving coins delivered from said coin passageway to stack the coins therein, said stacking station including a pair of coin stacking drums spaced away from said coin passageway by the same distance, a drive mechanism for rotating said coin stacking drums in opposite directions and intermittingly in synchronism with the delivery cycle of the coins, each of said coin stacking drums having on its outer periphery a ridge providing a support surface for supporting the coins delivered from said coin passageway, said ridges on said coin stacking drums being arranged in phase and in opposite orientations, and a stack guide plate disposed opposite to said coin stacking drums and between said coin stacking drums and said coin passageway for supporting an edge of each of the coins in cooperation with said coin stacking drums, each of said ridges being of such a spiral configuration that each coin support surface of said ridges is inclined downwardly toward said stack guide plate so that the coins are stacked with their leading edges inclined upwardly to prevent jamming of the coins, said drive mechanism being adapted to rotate each of said coin stacking drums in such a direction that the coins on said support surfaces of said ridges are moved downwardly.

2. Apparatus according to claim 1, wherein said stack guide plate is adjustable so as to move relative to said coin stacking drums in accordance with the kind of coin.

3. Apparatus according to claim 1, wherein each coin stacking drum is adjustable so as to be rotated to set is initial position in accordance with the kind of coin.

* * * * *